J. D. JONES.
BEARING.
APPLICATION FILED FEB. 3, 1912.

1,043,603.

Patented Nov. 5, 1912.

Witnesses

John D. Jones
Inventor,
by
Attorneys.

UNITED STATES PATENT OFFICE.

JOHN D. JONES, OF WALLA WALLA, WASHINGTON.

BEARING.

1,043,603.     Specification of Letters Patent.     Patented Nov. 5, 1912.

Application filed February 3, 1912. Serial No. 675,162.

*To all whom it may concern:*

Be it known that I, JOHN D. JONES, a citizen of the United States, residing at Walla Walla, in the county of Walla Walla and State of Washington, have invented a new and useful Bearing, of which the following is a specification.

The present invention relates to improvements in bearings, the primary object of the invention being the provision of a practically-dust proof lubricant carrying casing, adapted to be driven within a pulley where used upon shafting, the same being preferably made in a single casting to provide two oppositely disposed lubricant retaining casings or chambers with a concentrically disposed bearing sleeve.

A further object of the present invention is the provision of a bearing made in the form of a cylindrical casing, the ends of which are provided with shaft receiving apertures, one end being further provided with a rim which limits the introduction of the casing within a hub, while formed integral within the casing and suspended centrally of its longitudinal length and concentrically with relation to the cross section thereof, is the main bearing sleeve of the bearing, whose free ends project in opposite directions into oppositely disposed lubricant containing compartments.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
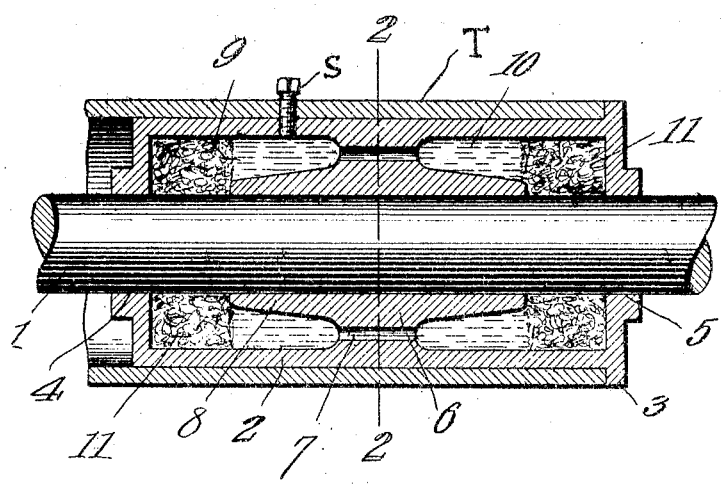
Figure 2:
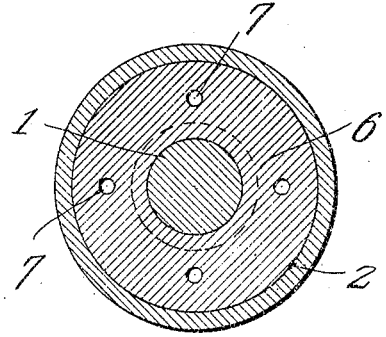

In the drawings—Figure 1 is a longitudinally sectional view through the bearing mounted upon the shaft. Fig. 2 is a section taken on line 2—2 of Fig. 1.

Referring to the drawings, the numeral 1 designates a shafting, which may either rotate or be stationary while 2 designates the cylindrical casing of the bearing, which is insertible in the hub of any form of pulley, or support or hanger, the pulley being used when the shaft is stationary while the support or hanger is used when the shaft rotates. In the present instance the casing 2 is shown inserted in one end of a supporting member T and rotates therewith, a set screw S, retaining the casing against longitudinal and circumferential movements relatively to the member T.

The casing 2 is preferably cast and is provided at one end with the peripheral rim 3, which acts as a limiting means for the insertion of the casing 2, while the closed ends of the casing are provided with the oppositely disposed shaft receiving apertures 4 and 5.

Carried within the casing is a central web 6 provided with a plurality of apertures 7, when desired, and carrying the main bearing sleeve 8, whose reduced ends project in opposite directions into the respective lubricant carrying chambers or compartments 9 and 10, providing a space between the ends thereof and the respective ends of the casing 2 where portions of the shaft 1 are placed in direct contact with the packing 11 disposed within the chambers 9 and 10 and carrying the lubricant.

From the foregoing description taken in connection with the drawings, it is evident that a bearing constructed according to the present invention provides a plurality of bearing points, that is in the respective ends of the casing 2 and in the bearing sleeve 8, said bearing sleeve 8 being the main bearing and disposed in such position within the casing as to be protected by the lubricant carrying packing so that dust and dirt is excluded and prevented from affecting the bearing sleeve 8, as any dust or dirt entering through the openings 4 and 5 will be retained within the lubricant carrying packing and be prevented thereby from affecting the shafting at its contact point with the sleeve 8.

By reason of the web 6 the main bearing sleeve 8 is at all times rigidly held within the casing, and as the shaft receiving apertures 4 and 5 are bored simultaneously with the sleeve 8, the bearing surfaces in the ends of the casing and in the sleeve 8 are absolutely centered and remain in such condition during the running of the bearing.

What is claimed is:

1. The combination with a supporting member, of a cylindrical bearing box carried thereby, and having formed integral therewith and incased therein a longitudinally disposed bearing sleeve with the ends thereof in spaced relation to the ends of the box.

2. The combination with a supporting member, of a bearing having a cylindrical casing provided with oppositely disposed shaft receiving apertures, said casing being carried by the supporting member, and a concentrically disposed main bearing sleeve within and surrounded by the casing and providing two lubricant containing chambers.

3. The combination with a supporting member, of a bearing having a cylindrical casing, the ends of which are provided with shaft receiving apertures, said casing being carried by the supporting member, a centrally disposed annular web formed integral with the wall of the casing and dividing the casing into oppositely disposed lubricant containing chambers, and a main bearing sleeve formed integral with and carried by the web and disposed to have its ends project within said chambers and spaced from the ends of the casing.

4. The combination with a supporting member, of a bearing having a cylindrical casing provided with oppositely disposed shaft receiving apertures, said casing being carried by the supporting member, a concentrically disposed main bearing sleeve within and surrounded by the casing and providing two communicating lubricant containing chambers, and a packing interposed between each end of the sleeve and the adjacent end of the casing.

5. A bearing box having a cylindrical casing provided with oppositely disposed shaft receiving apertures, and having a concentrically disposed main bearing sleeve within and surrounded by the casing, said casing having a web connecting said bearing sleeve and providing two lubricant containing chambers, and a packing interposed between each end of the sleeve and the adjacent end of the casing.

6. An insertible bearing box comprising a casing provided with stationary end pieces, said casing inclosing two lubricant receiving chambers, and a bearing sleeve secured in said casing having its ends spaced inwardly from said end pieces.

7. An insertible bearing box comprising a casing provided with stationary end pieces, said casing inclosing two lubricant receiving chambers, a bearing sleeve secured in said casing and having its ends spaced inwardly from said end pieces, and packings arranged in said casing between the end pieces and the ends of the said bearing sleeve.

8. A bearing comprising a casing with stationary end pieces, a bearing sleeve secured in said casing with ends spaced inwardly from said end pieces, and packings in said casing between the end pieces of the casing and the ends of the bearing sleeve, all arranged to provide lubricant chambers between said packings.

9. A bearing box comprising a casing with stationary end pieces and a bearing sleeve between said end pieces, the ends of said bearing sleeve being spaced inwardly from said end pieces, said bearing sleeve and end pieces having shaft openings arranged in axial alinement.

10. A bearing box consisting of a casing with integral end pieces, a bearing sleeve arranged in said casing between said end pieces, and with its ends spaced inwardly therefrom, said bearing sleeve and said end pieces being provided with shaft openings in axial alinement with each other to provide three bearing surfaces, and packings in said casing between the end pieces and the ends of the bearing sleeve, all arranged to provide fluid lubricant chambers between said packings.

In testimony that I claim the foregoing as my own, I have hereto affixed my signature in the presence of two witnesses.

JOHN D. JONES.

Witnesses:
SELINA WILLSON,
ERNEST F. RILEY.